(12) United States Patent
Ridenour et al.

(10) Patent No.: US 11,598,246 B2
(45) Date of Patent: Mar. 7, 2023

(54) INTERNAL COMBUSTION ENGINE AND PISTON HAVING PISTON BOWL

(71) Applicant: DEERE & COMPANY, Moline, IL (US)

(72) Inventors: Dustin W. Ridenour, Independence, IA (US); Nam Hyo Cho, Cedar Falls, IA (US); Michael J. Maney, Cedar Falls, IA (US); James M. Krasselt, Denver, IA (US); Bryan T. Geisick, Cedar Falls, IA (US); Ankit Y. Patel, Woodridge, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/304,561

(22) Filed: Jun. 23, 2021

(65) Prior Publication Data
US 2022/0412249 A1    Dec. 29, 2022

(51) Int. Cl.
*F02F 3/00*      (2006.01)
*F02B 23/06*    (2006.01)
*F02F 3/26*      (2006.01)

(52) U.S. Cl.
CPC ........... *F02B 23/0672* (2013.01); *F02F 3/26* (2013.01)

(58) Field of Classification Search
CPC ............. F02B 23/0693; F02B 23/0672; F02B 23/0651; F02B 23/0696; F02B 23/0621
USPC ...................................................... 123/193.6
See application file for complete search history.

(56) References Cited

U.S. PATENT DOCUMENTS

| | | | |
|---|---|---|---|
| 5,029,563 A * | 7/1991 | Hu | F02B 23/063 123/262 |
| 5,771,872 A * | 6/1998 | Ueda | F02B 23/08 123/661 |
| 7,210,448 B2 | 5/2007 | Stanton et al. | |
| 8,156,927 B2 * | 4/2012 | Iikubo | F02B 23/0693 123/664 |
| 10,294,876 B2 * | 5/2019 | Laget | F02D 41/0027 |
| 2005/0115537 A1 * | 6/2005 | Liu | F02F 3/26 123/276 |
| 2006/0070603 A1 * | 4/2006 | Stanton | F02B 23/0651 123/301 |
| 2011/0253096 A1 * | 10/2011 | Easley | F02F 3/28 123/294 |
| 2012/0234285 A1 * | 9/2012 | Venugopal | F02B 23/0669 123/193.6 |
| 2014/0048036 A1 * | 2/2014 | Zoeller | F02M 61/1826 123/294 |

(Continued)

*Primary Examiner* — Long T Tran
*Assistant Examiner* — James J Kim (57) ABSTRACT

A piston for an internal combustion engine includes a piston bowl. The piston bowl has a half section profile that includes a bowl entry extending radially from the longitudinal piston center axis, a first bowl recess extending radially from the bowl entry and defining a bowl depth and a first radius of curvature, a second bowl recess extending radially from a first bowl recess to an end perimeter surface and defining a second radius of curvature, a bowl lip defined by the first bowl recess and the second bowl recess, and a bowl edge defined by the second bowl recess and the end perimeter surface. The first bowl recess further defines a first bowl recess exit angle at the bowl lip. The second bowl recess further defines a second bowl recess exit angle at the bowl edge.

20 Claims, 8 Drawing Sheets

(56) References Cited

U.S. PATENT DOCUMENTS

| 2015/0020765 | A1* | 1/2015 | Pierpont | F02F 3/26 |
| | | | | 123/27 R |
| 2017/0058824 | A1* | 3/2017 | Weiss | F02F 3/26 |
| 2017/0159549 | A1* | 6/2017 | Uehara | F02F 3/28 |
| 2020/0340391 | A1* | 10/2020 | Machold | F02B 23/0618 |

* cited by examiner

INTERNAL COMBUSTION ENGINE AND PISTON HAVING PISTON BOWL

BACKGROUND

A direct injection diesel engine is an internal combustion engine in which injected fuel is ignited as a result of temperature and pressure conditions within a combustion chamber. Engines are subject to increasingly stringent emissions standards for engine-out emissions, including particulate matter. Soot formed in the combustion chamber of an engine may be a source of such particulate matter. The characteristics of the pistons forming the combustion chamber in an engine may affect such engine-out emissions and engine efficiency.

SUMMARY

Various aspects of examples of the present disclosure are set out in the claims.

In an embodiment, a piston for reciprocating within a cylinder bore has a cylinder bore radius in an internal combustion engine. The piston includes a piston body including an outer cylindrical surface and defined along a longitudinal piston center axis, the piston body having a first axial piston end and a second axial piston end, and a piston bowl defined in the first axial piston end, surrounded by an end perimeter surface on the first axial piston end, and configured to receive a fuel. The piston bowl has a half section profile having a bowl entry extending radially from the longitudinal piston center axis, a first bowl recess extending radially from the bowl entry and defining a bowl depth and a first radius of curvature, a second bowl recess extending radially from the first bowl recess to the end perimeter surface and defining a second radius of curvature, a bowl lip defined by the first bowl recess and the second bowl recess, the first bowl recess further defining a first bowl recess exit angle at the bowl lip, and a bowl edge defined by the second bowl recess and the end perimeter surface, the second bowl recess further defining a second bowl recess exit angle at the bowl edge. The bowl entry of the piston bowl is configured to initially receive the fuel before the fuel is directed to the first bowl recess exit angle.

The piston bowl may have an outer bowl radius defined between the longitudinal piston center axis and the bowl edge, the outer bowl radius may be between 85% and 90% of the cylinder bore radius. The bowl depth may be between 20% and 25% of the outer bowl radius. The bowl lip may be located at a first bowl recess axial height of between 50% and 60% of the bowl depth. The first radius of curvature and the second radius of curvature may each be between 40% and 70% of the bowl depth. The first bowl recess exit angle may be formed between 5 and 20 degrees from the longitudinal piston center axis. The second bowl recess exit angle may be between 5 and 20 degrees from the longitudinal piston center axis. The bowl entry may extend at an angle relative to the longitudinal piston center axis of between 100 and 110 degrees. The piston bowl may be configured to receive the fuel at a spray angle between 125 degrees and 140 degrees. The bowl lip may be located at an inner bowl radius, the bowl edge may be located at an outer bowl radius, and the inner bowl radius may be between 85% and 90% of the outer bowl radius.

In an embodiment, an internal combustion engine includes a cylinder head defining a cylinder upper surface, a cylinder bore having a cylinder bore radius, and a piston for reciprocating within the cylinder bore. The piston includes a piston body, including an outer cylindrical surface and being defined along a longitudinal piston center axis, and a piston bowl. The piston body has a first axial piston end and a second axial piston end. The piston bowl is defined in the first axial piston end, surrounded by an end perimeter surface on the first axial piston end, and configured to receive a fuel. The piston bowl has a half section profile including a bowl entry extending radially from the longitudinal piston center axis, a first bowl recess extending radially from the bowl entry and defining a bowl depth and a first radius of curvature, a second bowl recess extending radially from the first bowl recess to the end perimeter surface and defining a second radius of curvature, a bowl lip defined by the first bowl recess and the second bowl recess, the first bowl recess further defining a first bowl recess exit angle at the bowl lip, and a bowl edge defined by the second bowl recess and the end perimeter surface, the second bowl recess further defining a second bowl recess exit angle at the bowl edge. The bowl entry of the piston bowl is configured to initially receive the fuel before the fuel is directed to the first bowl recess exit angle.

A piston clearance may be defined between the cylinder upper surface and the end perimeter surface, the piston clearance may be between 1 and 5 millimeters. The engine may further include a fuel injector configured to deliver the fuel into the piston bowl at a spray angle of between 125 and 140 degrees. The piston bowl may have an outer bowl radius defined between the longitudinal piston center axis and the bowl edge, the outer bowl radius may be between 75% and 90% of the cylinder bore radius. The bowl depth may be between 20% and 25% of the outer bowl radius. The bowl lip may be located at a first bowl recess axial height of between 50% and 60% of the bowl depth. The first radius of curvature and the second radius of curvature may each be between 40% and 70% of the bowl depth. The first bowl recess exit angle may be formed between 5 and 20 degrees from the longitudinal piston center axis. The second bowl recess exit angle may be between 5 and 20 degrees from the longitudinal piston center axis. The bowl entry may extend at an angle relative to the longitudinal piston center axis of between 100 and 110 degrees.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one embodiment of the subject matter of this disclosure is understood by referring to FIGS. 1 through 8 of the drawings.

Figure 1:
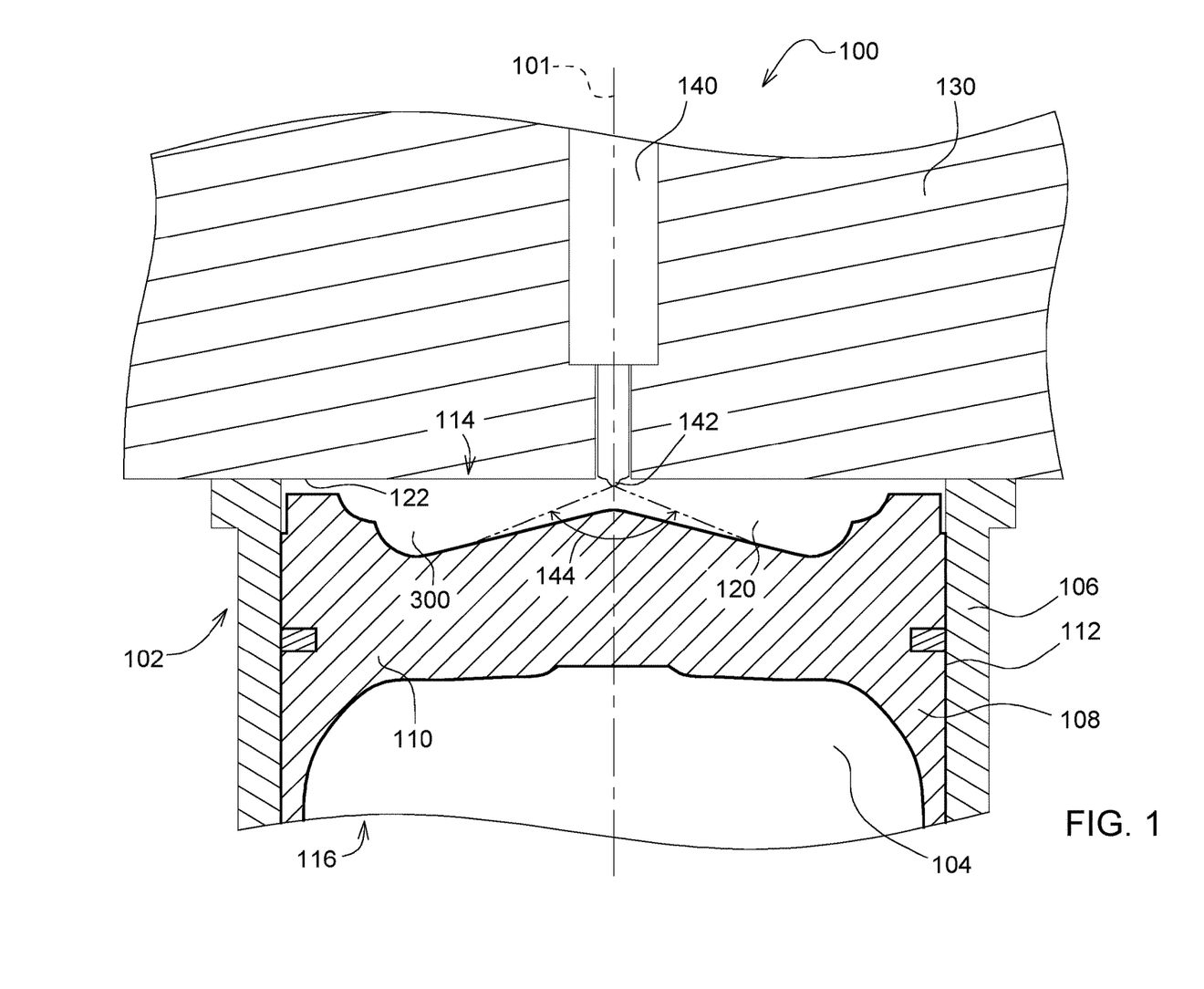
FIG. 1 is a partial cross-sectional view of an internal combustion engine in accordance with one or more embodiments of the present disclosure.

Reference is now made to FIG. 1, which illustrates a partial cross-sectional view of an internal combustion engine 100. In one example, engine 100 operates on the principal of reciprocating pistons moved in response to a combustion event in a combustion chamber, as described below. The reciprocating motion of the pistons is converted into rotary motion through the means of a crankshaft (not shown). However, it should be apparent to those skilled in the art that the reciprocating motion of the pistons may be utilized in various types of engines, particularly power engines for moving vehicles in non-limiting examples.

As described in greater detail below, the engine 100 is configured to result in improved engine-out emissions, particularly a reduction in soot during the combustion process. Soot generally includes a combination of smoke and particulate matter, e.g., from impure carbon resulting from incomplete combustion. As such, soot may be reduced by more evenly mixing the fuel and air in the combustion chamber.

As shown, engine 100 includes a block 102 having one or more cylinder bores 104 that may be defined by cylinder liners 106 for receiving reciprocating pistons 108, only one of which is shown. A cylinder head 130 bounds one end of the cylinder bore 104 and houses the components for delivering fuel and air to the cylinder bore 104, as described in greater detail below. The cylinder head 130 includes a cylinder upper surface 122.

Although not shown in detail, the piston 108 includes a cylindrical piston body 110 having a pivotal connection via a wrist pin and a connecting rod to a crankshaft to provide a rotary power output in response to reciprocation of piston 108. A plurality of pistons 108 may be provided depending upon the requirements and duty cycle of the engine 100.

The piston body 110 has an outer cylindrical surface or side wall 112 and first and second axial ends 114, 116. A piston (or combustion) bowl 300 is defined in the body 110 of the piston 108 at the first axial end 114. The piston bowl 300 is discussed in greater detail below.

The piston 108 is arranged within cylinder bore 104 to define a combustion chamber 120 bounded by the cylinder liner 106, the cylinder head 130, and the piston bowl 300. The head 130 has intake passages or ports and exhaust passages or ports. Although not illustrated in detail, at least one intake valve is positioned to open and close the intake passage to selectively allow the entry of air into the combustion chamber 120, and at least one exhaust valve is positioned to open and close the exhaust passage to selectively allow the exit of the combustion products from the combustion chamber 120. One having ordinary skill in the art will recognize that the engine 100 may include any number and/or configuration of valves in one or more embodiments of the present disclosure. A fuel injector 140 is arranged within the cylinder head 130 with an injector tip 142 positioned to deliver fuel into the combustion chamber 120 at a fuel spray angle 144. The fuel injector 140 may be angled relative to a longitudinal piston center axis 101, as shown, or coaxial or parallel with the longitudinal piston center axis 101.

The fuel may be injected coaxially with the axis of the injector 140 and/or with the longitudinal piston center axis 101 in a radiated pattern so as to permeate the combustion chamber 120. The number of discrete holes provided in injector 140, the cross-sectional flow areas, and the angle of spray may vary in one or more embodiments of the present disclosure.

Although not shown, in one or more embodiments, the intake air is pressurized by a compressor of a turbocharger and cooled by means of an after cooler, and the exhaust gasses pass through a turbocharger turbine and then to exhaust after treatment devices. In some embodiments, exhaust gas recirculation may be provided to reduce the combustion temperatures and reduce the oxides of nitrogen.

In certain embodiments, the engine 100 operates on a compression ignition cycle in which air that has entered combustion chamber 120 through the intake passage and intake valve is pressurized to such an extent that fuel injected from the fuel injector 140 at the appropriate time and in the appropriate quantity is ignited by the heat of compression. In one embodiment, the engine 100 operates according to a four-stroke combustion cycle, although in other embodiments, the engine 100 may operate according to a two stroke or another combustion cycle.

Accordingly, in certain embodiments, the four-stroke combustion and expansion cycle includes an air suction or intake stroke, an air compression stroke, a combustion stroke right after fuel injection, and an exhaust stroke. During the intake stroke, which initiates slightly before, near, or at top dead center (TDC) and ends slightly after, near, or at bottom dead center (BDC), the intake valve is open such that the piston 108 pulls air into the cylinder bore 104 through its downward motion in a naturally aspirated engine or air is forced into the cylinder bore 104 in a turbocharged or other forced induction engine. Through the intake stroke, intake gas undergoes a toroidal or swirling flow motion in the cylinder bore 104. The strength of swirling flow or angular momentum may be measured on a swirl flow bench as a swirl ratio, which is non-dimensional and may be independent of engine speed.

During the subsequent compression stroke, the intake valve closes and piston 108 rises to compress the air in the cylinder bore 104. During or shortly before the combustion stroke, which is near TDC, fuel is injected into the combustion chamber 120, particularly the piston bowl 300, and is ignited by the elevated temperature and pressure. FIG. 1 depicts the piston 108 near TDC, e.g., during the beginning of the combustion stroke as fuel is being introduced into the combustion chamber 120. As described in greater detail below, the piston bowl 300 includes characteristics to enhance the mixing of the air and fuel.

Upon combustion, the energy release of the fuel and air mixture drives the piston 108 downward in the cylinder bore 104 to produce kinetic energy. During the exhaust stroke, the exhaust valve is opened as the piston 108 rises to force the exhaust products out of the cylinder bore 104.

Although not shown, operation of the engine 100 (e.g., the fuel injector(s) 140, piston(s) 108, and valves) may be controlled by a control system with a controller, which may be configured as a computing device with associated processor devices and memory architectures, as a hard-wired computing circuit (or circuits), as a programmable circuit, or otherwise. As such, the controller may be configured to execute various computational and control functionality with respect to the work machine and/or associated system.

Figure 2:
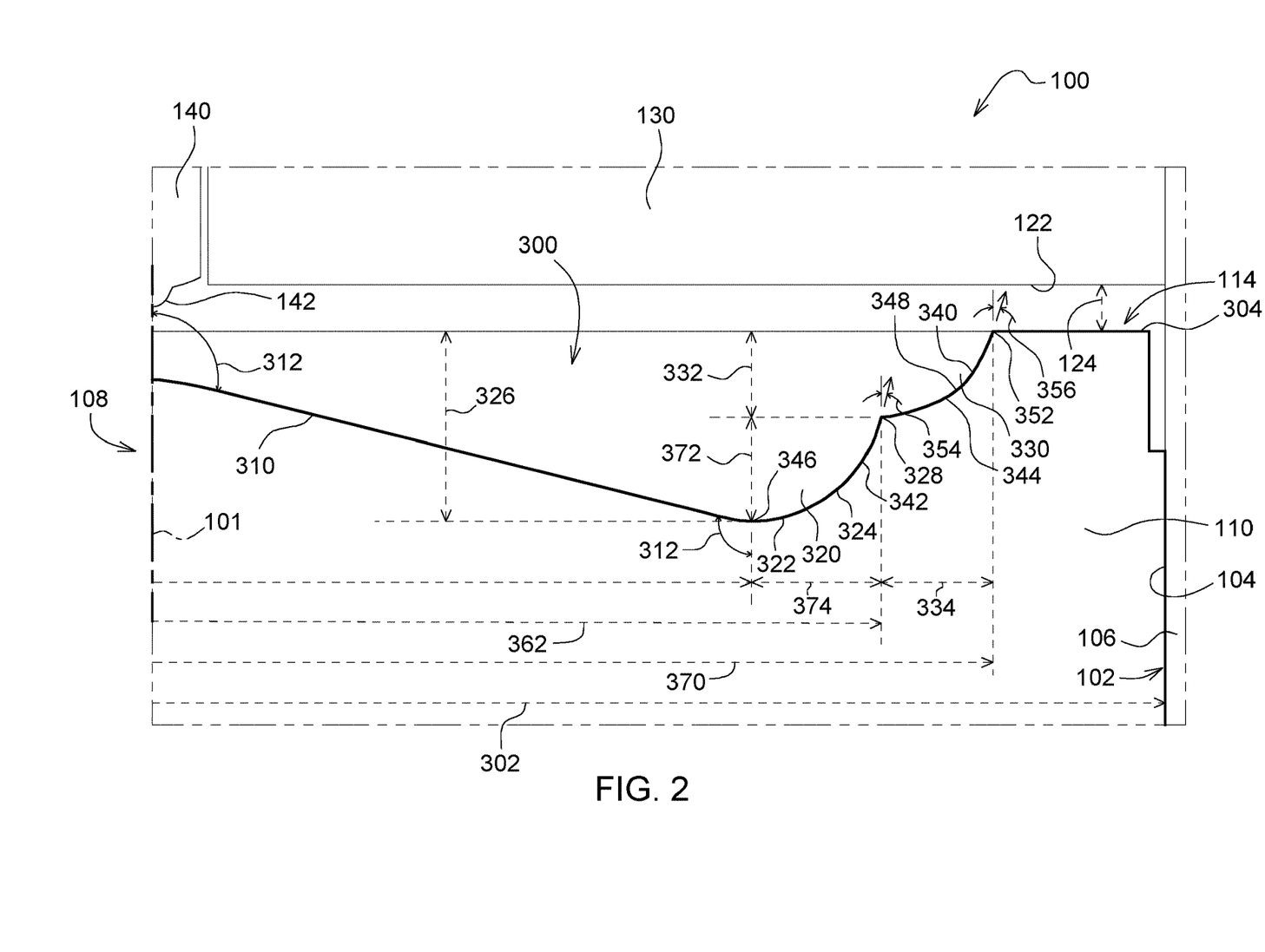
FIG. 2 is a partial cross-sectional view of an internal combustion engine and piston in accordance with one or more embodiments of the present disclosure.

FIG. 2 is a half profile cross-sectional view of the piston bowl 300 in accordance with an embodiment of the present disclosure. In the illustrated embodiment, the piston bowl center axis is aligned or coaxial with the engine cylinder axis, which is aligned or coaxial with the longitudinal piston center axis 101, although other embodiments may vary. As noted above, the piston bowl 300 is annular such that the overall structure corresponds to the view of FIG. 2 rotated about the longitudinal piston center axis 101. The terms "radial" and "axial" are used herein to reference orientations relative to the longitudinal piston center axis 101 in a cylindrical coordinate system. In particular, the term "radial" refers to a direction or orientation perpendicular to the longitudinal piston center axis 101, and the term "axial" refers to a direction or orientation parallel to the longitudinal piston center axis 101.

Generally, the piston bowl 300 is formed in the first axial piston end 114 of the piston body 110 reciprocating within the cylinder bore 104 having a cylinder bore radius 302. As such, the piston bowl 300 is surrounded by an end perimeter surface 304 that extends between the piston bowl 300 and the outer cylindrical surface 112 of the piston body 110. In the embodiment illustrated in FIG. 2, a piston clearance 124 is defined between the cylinder upper surface 122 and the end perimeter surface 304. The cylinder upper surface 122 in the illustrated embodiment is the cylinder head fire deck surface or the surface of the cylinder head 130 closest to the end perimeter surface 304 when the piston is 108 is at TDC. At TDC, the piston clearance 124, as shown in the embodiment of FIG. 2, is between 3 and 5 millimeters. In an additional embodiment, at TDC, the piston clearance 124 is between 1 and 5 millimeters. The piston clearance 124 reduces or eliminates deep valve pockets at the first axial piston end 114, which therefore further reduces particular matter generation in the engine 100.

In the illustrated embodiment, the piston bowl 300 includes a bowl entry 310 that extends radially outward from the longitudinal piston center axis 101 and axially inward into the piston body 110. In one embodiment, the bowl entry 310 is generally planar and extends at an angle 312 relative to the longitudinal piston center axis 101 of between 100 and 110 degrees. For clarity, the angle 312 of the generally planar bowl entry 310 is labeled in FIG. 2 as being measured at each of the radially inner and radially outer ends of the bowl entry 310. In additional embodiments not illustrated, the bowl entry 310 is generally planar and extends at an angle 312 relative to the longitudinal piston center axis 101 of between 103 and 107 degrees. In further embodiments, the bowl entry 310 extends at an angle 312 of between 100 and 115 degrees relative to the longitudinal piston center axis 101. As described in greater detail below, these characteristics may contribute to the reduction of soot formation at least in cooperation with one or more other features of the piston bowl 300.

As also shown in FIG. 2, the piston bowl 300 includes a first bowl recess 320 that extends radially outward from the bowl entry 310. The first bowl recess 320 may be considered to have a first bowl recess axial height 372 and a first bowl recess radial width 374. In this embodiment, the first bowl recess 320 includes a first curved surface 322 that extends from an outer end 346 of the bowl entry 310 radially outwardly into a first curved side wall 324 extending axially toward the first axial piston end 114. In one embodiment, the outer end 346 of the bowl entry 310, the first bowl recess 320, or the intersection therebetween, defines a bowl depth 326 that is the maximum axial depth of the piston bowl 300 relative to the end perimeter surface 304 of the piston end 114.

The piston bowl 300 further includes a second bowl recess 330 extending from the first curved side wall 324 to the end perimeter surface 304. The second bowl recess 330 may be considered to have a second bowl recess axial height 332 and a second bowl recess radial width 334. The second bowl recess 330 includes a second curved surface 348 that extends from the first curved side wall 324 radially outwardly into a second curved side wall 340 extending generally in the radial direction from the first curved side wall 324 and extending axially toward the first axial piston end 114. As described in greater detail below, these characteristics may contribute to the reduction of soot formation.

The first bowl recess 320 has a constant or partial radius profile in one or more embodiments and defines a first radius of curvature 342. The second bowl recess 330 similarly has a constant or partial radius profile in one or more embodiments and defines a second radius of curvature 344. Each of the first radius of curvature 342 and the second radius of curvature 344 is between 40% and 70% of the bowl depth 326 in an embodiment. In another embodiment, each of the first radius of curvature 342 and the second radius of curvature 344 is between 59% and 65% of the bowl depth 326. The first radius of curvature 342 and the second radius of curvature 344 are each between 50% and 60% of the bowl depth 326 in a further embodiment, and the first radius of curvature 342 and the second radius of curvature 344 are each between 45% and 65% of the bowl depth 326 in a still further embodiment. In an embodiment, the first radius of curvature 342 and the second radius of curvature 344 are within 20% of each other in an embodiment and within 10% of each other in a further embodiment.

The first bowl recess axial height 372, the cylinder bore radius 302, and/or the first bowl recess radial width 374 may be sized to reduce soot formation, discussed below. In an embodiment, the first bowl recess axial height 372 is between 50% and 60% of the bowl depth 326. In an embodiment, the second bowl recess axial height 332 is between 70% and 85% of the first bowl recess axial height 372.

The second bowl recess axial height 332, the cylinder bore radius 302, and the second bowl recess radial width 334 may be sized to reduce soot formation, discussed below.

The second bowl recess 330 is joined with the first bowl recess 320 at an annular bowl lip 328. In an embodiment, the first bowl recess 320 at the bowl lip 328 defines a first bowl recess exit angle 354. The first bowl recess exit angle 354 is between 5 and 20 degrees relative to the longitudinal piston center axis 101 in the illustrated embodiment. The first bowl recess exit angle 354 is between 10 and 15 degrees in an additional embodiment and between 0 and 25 degrees relative to the longitudinal piston center axis 101 in a further embodiment. As described in greater detail below, these characteristics may contribute to the reduction of soot formation.

The second bowl recess 330 is joined with the end perimeter surface 304 at an annular bowl edge 352. In an embodiment, the second bowl recess 330 at the bowl edge 352 defines a second bowl recess exit angle 356. The second bowl recess exit angle 356 is between 5 and 20 degrees relative to the longitudinal piston center axis 101 in the illustrated embodiment. The second bowl recess exit angle 356 is between 10 and 15 degrees in an additional embodiment and between 0 and 25 degrees relative to the longitudinal piston center axis 101 in a further embodiment. As described in greater detail below, these characteristics may contribute to the reduction of soot formation.

Further, the piston bowl 300 of an embodiment may be considered to have an inner bowl radius 362 in the radial direction from the longitudinal piston center axis 101 to the bowl lip 328 and an outer bowl radius 370 in the radial direction from the longitudinal piston center axis 101 to the bowl edge 352. The inner bowl radius 362 and bore radius 302 may be sized to reduce soot formation, discussed below. In one or more embodiments, the inner bowl radius 362 is between 85% and 90% of the outer bowl radius 370, and, in one or more embodiments, the outer bowl radius 370 is between 80% and 90% of the cylinder bore radius 302.

The bowl depth 326 and outer bowl radius 370 may be sized to reduce soot formation, discussed below. In an embodiment, the bowl depth 326 is between 20% and 25% of the outer bowl radius 370. In one or more additional embodiments, the bowl depth 326 is between 15% and 30% of the outer bowl radius 370.

Figure 3:
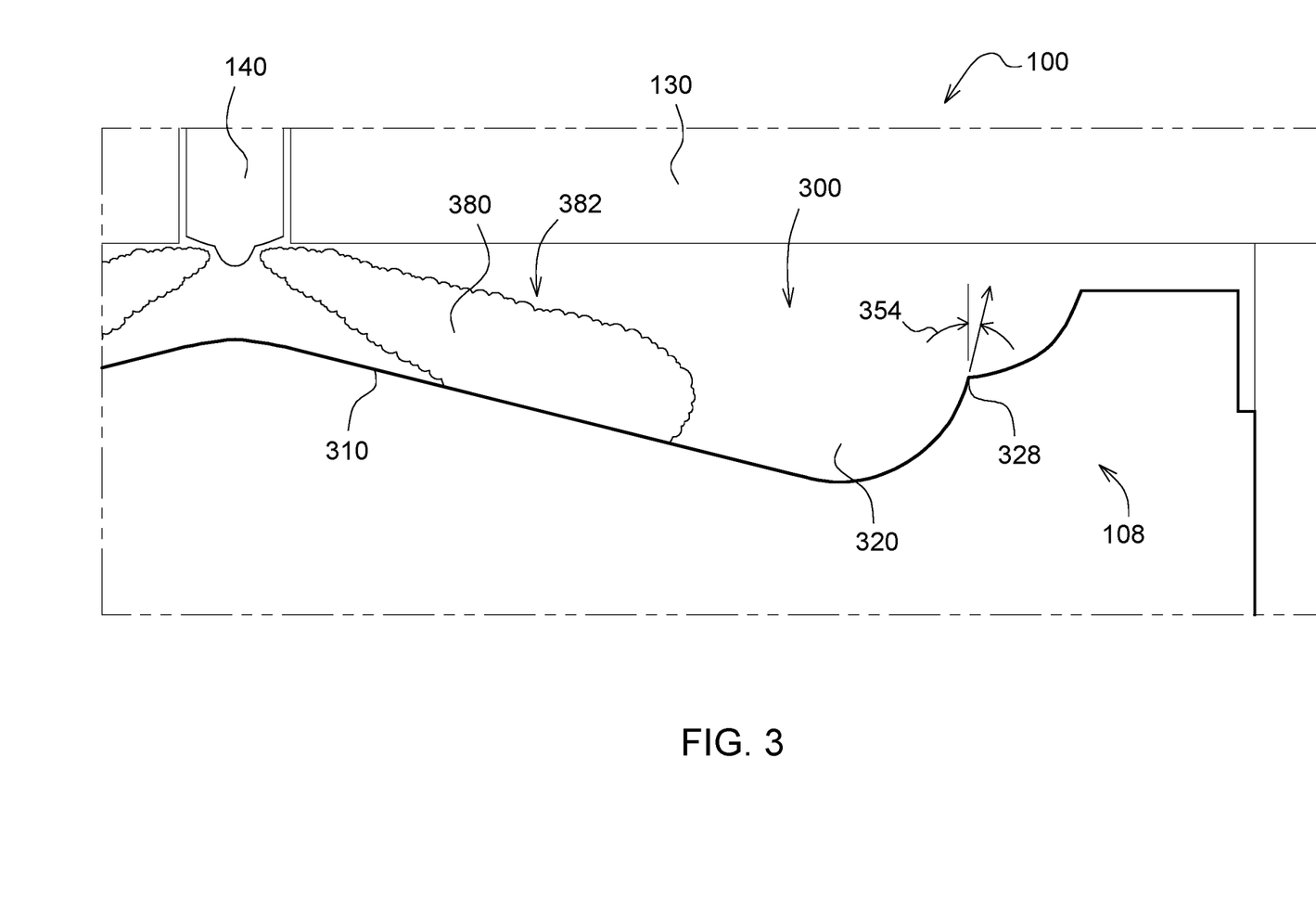
FIG. 3 is a graphical representation of the mixing of air and fuel during the combustion process within the internal combustion engine of FIG. 2 in accordance with an embodiment of the present disclosure.
Figure 4:
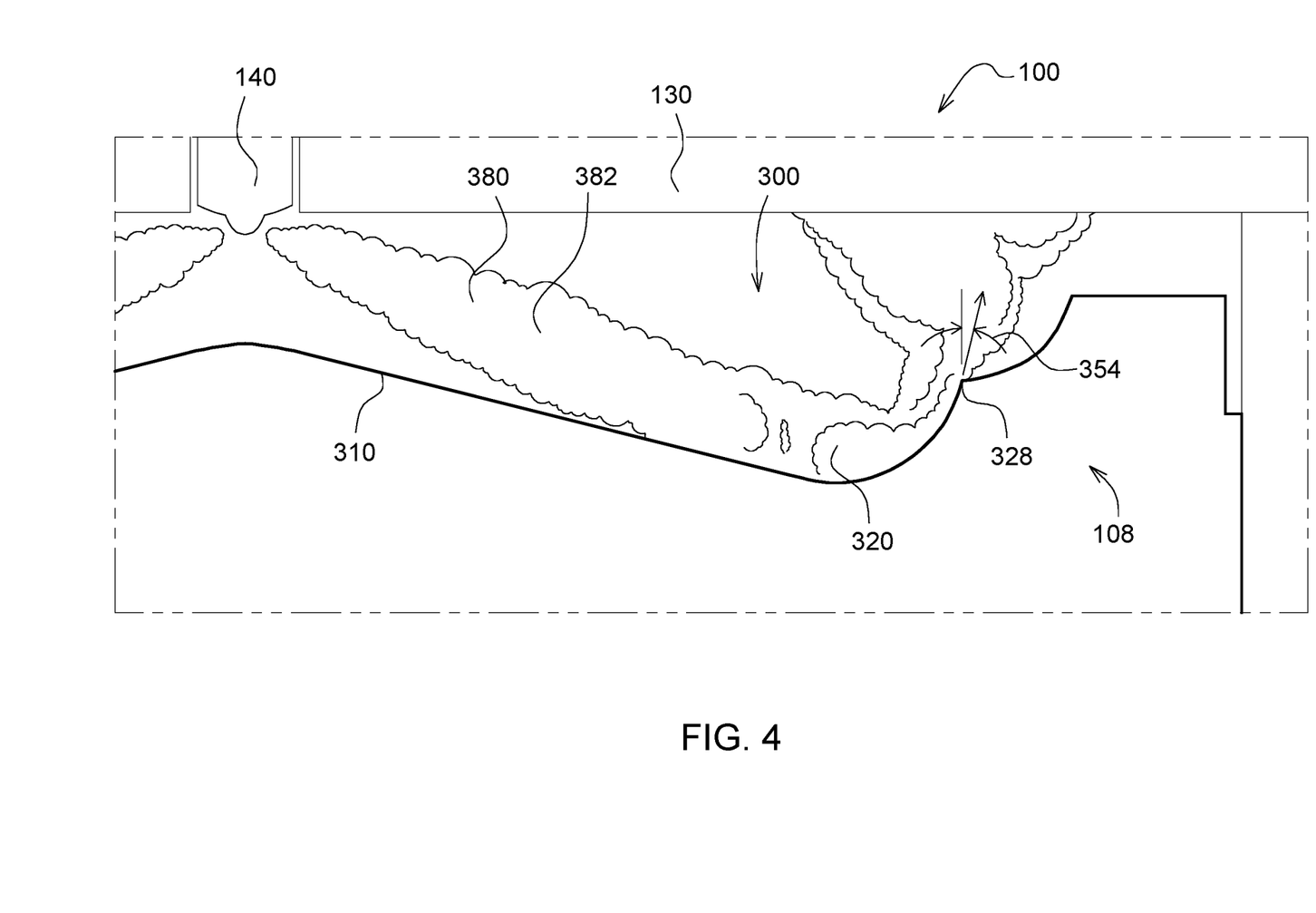
FIG. 4 is a graphical representation of the mixing of air and fuel during the combustion process within the internal combustion engine of FIG. 2 in accordance with an embodiment of the present disclosure.
Figure 5:
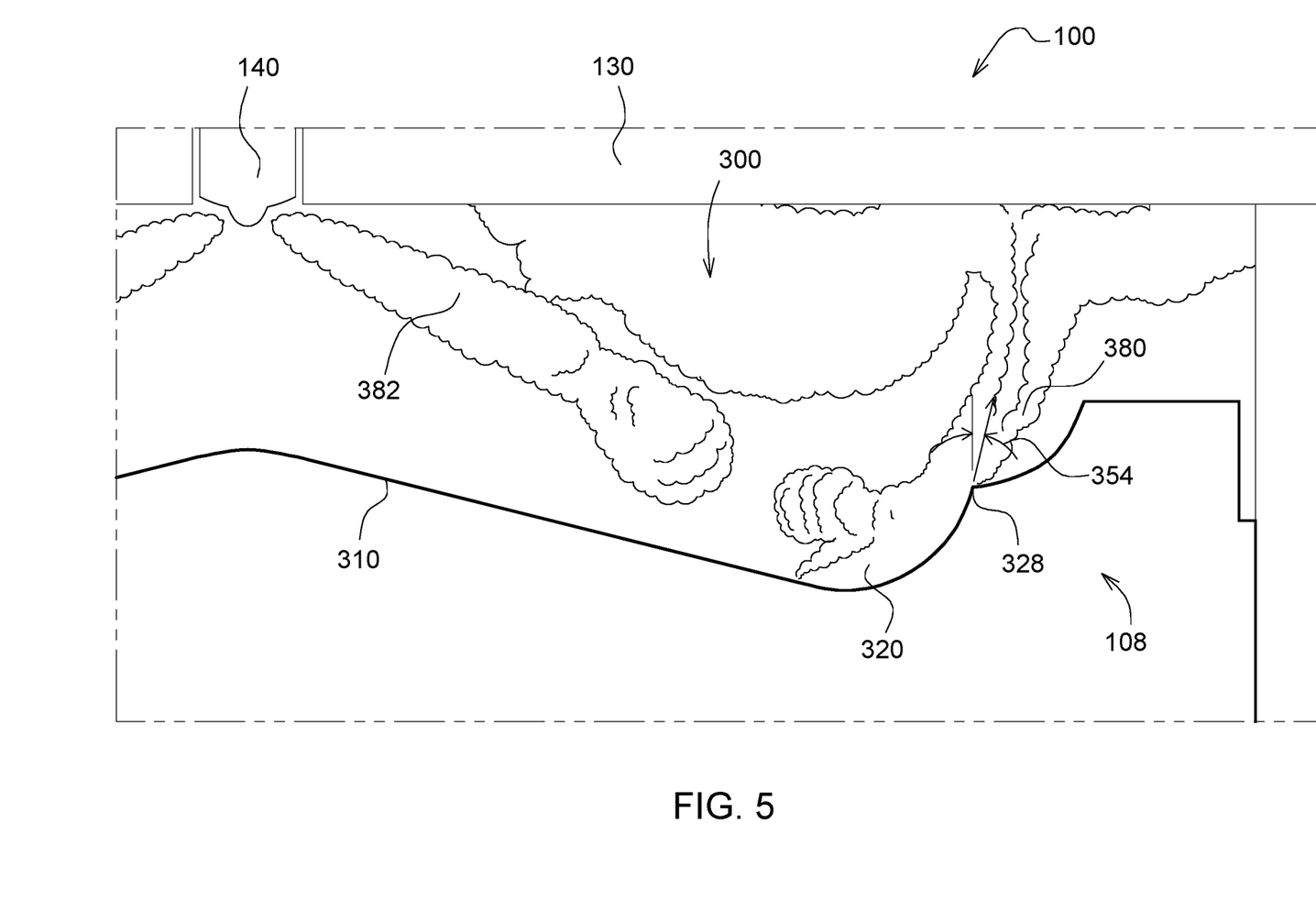
FIG. 5 is a graphical representation of the mixing of air and fuel during the combustion process within the internal combustion engine of FIG. 2 in accordance with an embodiment of the present disclosure.

FIGS. 3-5 depict examples of operational characteristics of the embodiments discussed herein. FIGS. 3-5 illustrate the development of the mixing of air and fuel during the combustion process at different crank angles in the form of equivalence ratios during full load of the engine 100. FIG. 3 is an equivalence ratio graph within the piston bowl 300 for the air fuel mixture at a zero (0) degrees crank angle or at or near TDC. FIG. 4 is an equivalence ratio graph within the piston bowl 300 for the air fuel mixture at a 10 degrees crank angle after TDC. FIG. 5 is an equivalence ratio graph within the piston bowl 300 for the air fuel mixture at a 25 degrees crank angle after TDC.

Figure 6:
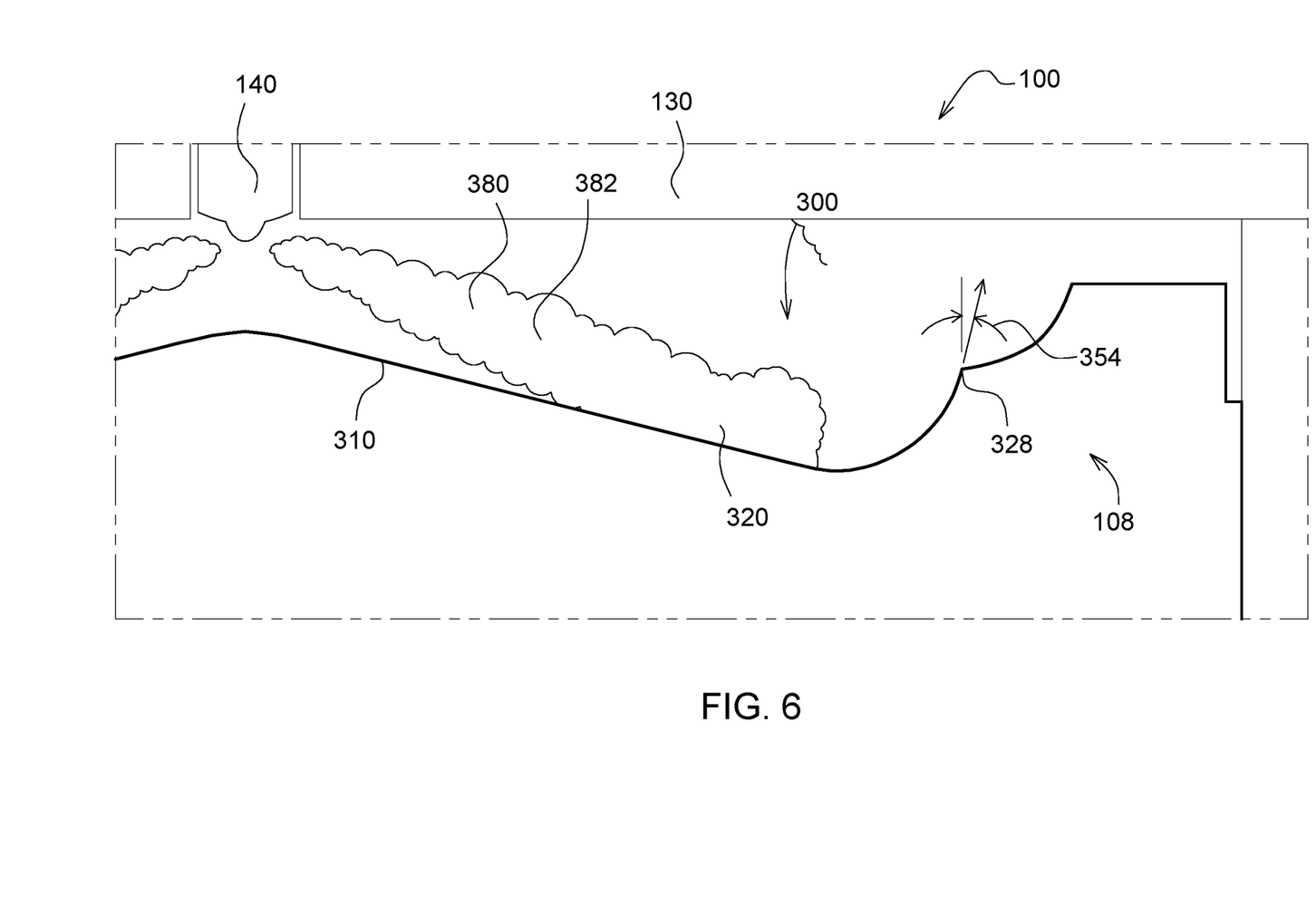
FIG. 6 is a graphical representation of the mixing of air and fuel during the combustion process within the internal combustion engine of FIG. 2 in accordance with an embodiment of the present disclosure.
Figure 7:
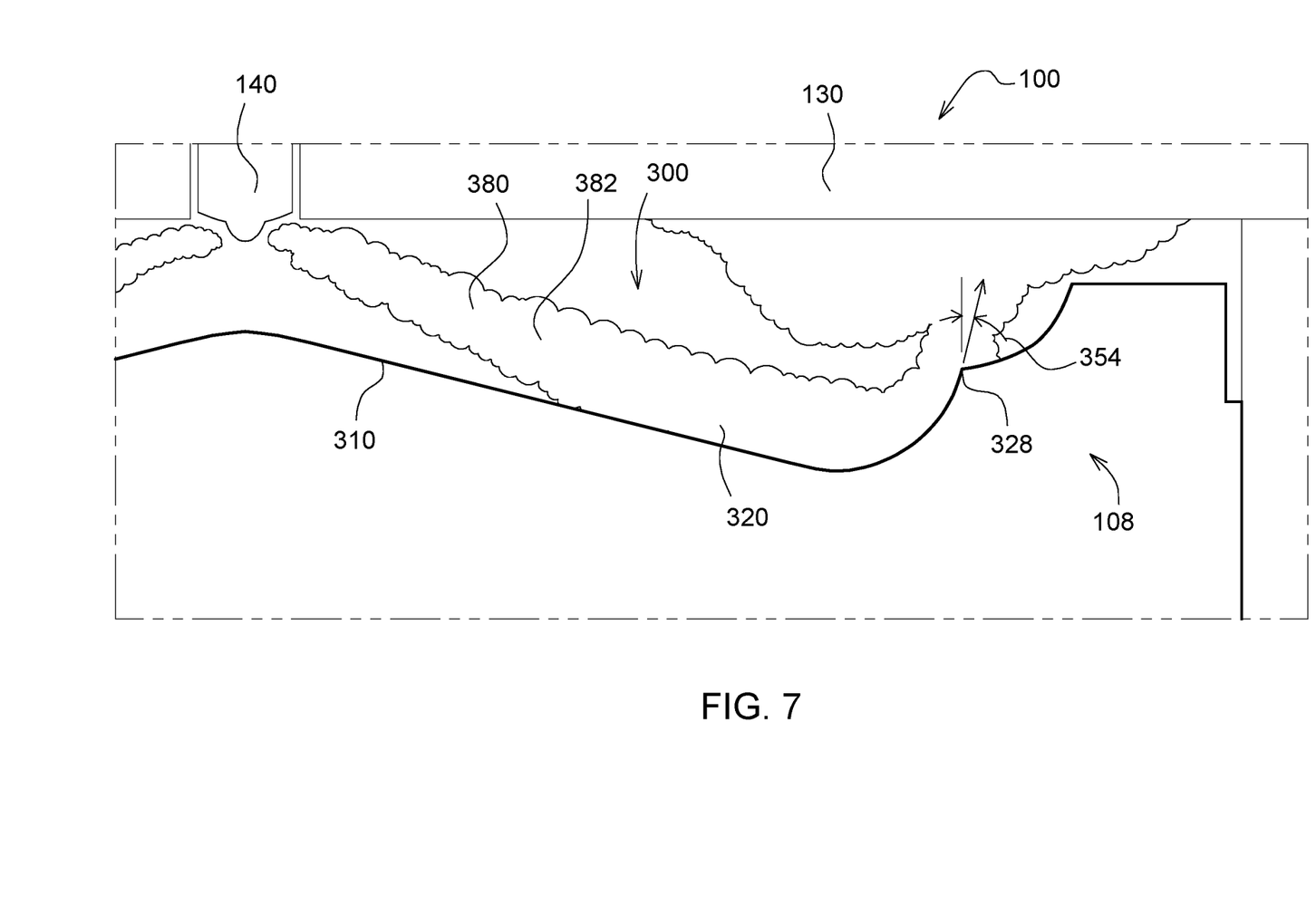
FIG. 7 is a graphical representation of the mixing of air and fuel during the combustion process within the internal combustion engine of FIG. 2 in accordance with an embodiment of the present disclosure.
Figure 8:
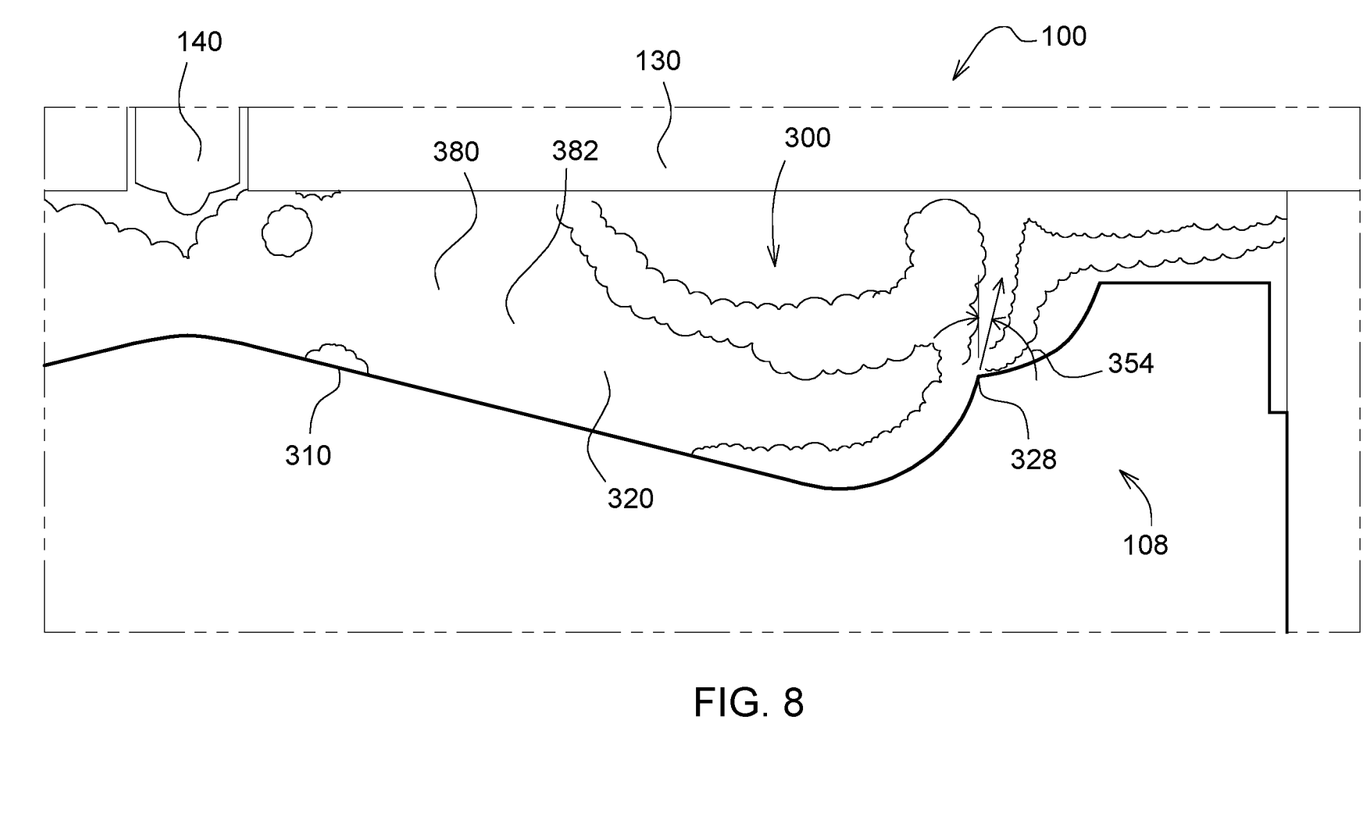
FIG. 8 is a graphical representation of the mixing of air and fuel during the combustion process within the internal combustion engine of FIG. 2 in accordance with an embodiment of the present disclosure.

FIGS. 6-8 depict examples of operational characteristics of embodiments discussed herein. In particular, FIGS. 6-8 illustrate the development of the mixing of air and fuel during the combustion process at different crank angles in the form of equivalence ratios during half load of the engine 100. FIG. 6 is an equivalence ratio graph within the piston bowl 300 for the air fuel mixture at 5 degrees crank angle before TDC. FIG. 7 is an equivalence ratio graph within the piston bowl 300 for the air fuel mixture at 5 degrees crank angle after TDC. FIG. 8 is an equivalence ratio graph within the piston bowl 300 for the air fuel mixture at 10 degrees crank angle after TDC.

As shown in FIGS. 3-8, the shape of the bowl 300 provides more homogeneous distribution of local equivalence (e.g., a more even mixing of the air fuel mixture), which leads to reduced particulate matter emissions and better fuel consumption. In particular, the bowl entry 310 of the piston bowl 300 initially receives the fuel spray plume 382 containing a fuel 380, at least in vapor form, before the spray plume 382 is directed to the first bowl recess 320, then toward or across the bowl lip 328 along or in alignment with the first bowl recess exit angle 354. In other words, the injector 140 directs the fuel spray plume 382 via the injector spray angle into initial contact with the bowl entry 310 before the spray plume 382 further flows radially outwardly into contact with the first bowl recess 320, then into the first curved sidewall 324, and then across the bowl lip 328 in a direction of the first bowl recess exit angle 354. As illustrated in at least FIGS. 5 and 8, the spray plume 382 of at least one embodiment may further contact, impinge upon, and/or flow axially toward the cylinder head 130 where the spray plume 382 splits, spreads, or diverges in a radially inward and radially outward direction. In an embodiment, the piston 108 is configured such that the spray plume 382 and/or the fuel 380 in vapor form travels only radially outward, and not radially inward, until the fuel 380 and/or the spray plume 382 impinges upon or contacts the cylinder head 130. Such action of the spray plume 382 and/or the fuel 380 due to features of the piston bowl 300 significantly improves mixing of the fuel and air to improve particulate matter emissions and efficiency.

With reference to FIGS. 6-8, due to greatly reduced fueling for the half-load power of the engine 100 at the same rated engine speed, the fuel injection period is greatly reduced as compared to the full-load condition shown in FIGS. 3-5. The mixing of the embodiments of the present disclosure is further enhanced under such shorter injection periods by the reduced distance from fuel injector tip to the bowl lip 328.

Additionally, the piston clearance 124 of embodiments of the present disclosure reduces the reverse squish flow strength as compared to conventional piston bowl designs during the expansion stroke when the piston 108 is moving downward. Further, due to the weaker flow in the squish area between the cylinder upper surface 122 and the end perimeter surface 304 and the reduced contact of the spray plume 382 with the surface of the cylinder liner 106, as indicated in FIG. 5 at 25 degrees after TDC, soot in lubrication oil on the cylinder liner surface is significantly reduced as compared to conventional piston bowl designs.

Accordingly, the present disclosure provides embodiments of the engine 100 and the piston 108 that may significantly improve engine-out emissions. The structural features of the embodiments of the piston bowl 300 and the engine 100 enhance mixing of fuel and air prior to combustion and thereby reduce particulate matter emissions. Further, due to improved mixing and fuel combustion and reduced heat transfer at the piston 108, the embodiments of the piston 108 and the engine 100 improve overall engine efficiency. In particular, the relative and absolute positions, sizes, and dimensions of the features discussed herein provide these advantages, including the location(s), angle(s), radii, and surface feature(s) of the bowl entry 310, the first bowl recess 320, the second bowl recess 330, the bowl lip 328, the bowl edge 352, and the other noted and depicted parameters. These bowl parameters in particular embodiments cooperate with other injector, piston, and/or engine characteristics to further reduce particulate matter production and fuel consumption. In embodiments, the engine and piston characteristics include a diesel engine of 1.0-3.5 L per cylinder displacement with a compression ratio of 15:1-20:1, an intake swirl ratio of between 0.5 and 2.0, and injector hole count of between 6 and 8 with an injector spray angle of between 125 and 140 degrees.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A piston for reciprocating within a cylinder bore having a cylinder bore radius in an internal combustion engine, the piston comprising:
   a piston body including an outer cylindrical surface and defined along a longitudinal piston center axis, the piston body having a first axial piston end and a second axial piston end; and
   a piston bowl defined in the first axial piston end, surrounded by an end perimeter surface on the first axial piston end, and configured to receive a fuel,
   the piston bowl having a half section profile comprising:
      a bowl entry extending radially from the longitudinal piston center axis;
      a first bowl recess extending radially from the bowl entry and defining a bowl depth and a first radius of curvature;
      a second bowl recess extending radially from the first bowl recess to the end perimeter surface and defining a second radius of curvature;
      a bowl lip defined by the first bowl recess and the second bowl recess, the first bowl recess further defining a first bowl recess exit angle at the bowl lip; and
      a bowl edge defined by the second bowl recess and the end perimeter surface, the second bowl recess further defining a second bowl recess exit angle at the bowl edge;
      wherein the bowl entry of the piston bowl is configured to initially receive the fuel from a fuel injector, which is spaced from the bowl entry and disposed at the longitudinal piston center axis, before the fuel is directed to the first bowl recess at the bowl lip along the first bowl recess exit angle.

2. The piston of claim 1, wherein the piston bowl has an outer bowl radius defined between the longitudinal piston center axis and the bowl edge, the outer bowl radius being between 80% and 90% of the cylinder bore radius.

3. The piston of claim 2, wherein the bowl depth is between 20% and 25% of the outer bowl radius.

4. The piston of claim 1, wherein the bowl lip is located at a first bowl recess axial height of between 50% and 60% of the bowl depth.

5. The piston of claim 1, wherein the first radius of curvature and the second radius of curvature are each between 40% and 70% of the bowl depth.

6. The piston of claim 1, wherein the first bowl recess exit angle is formed between 5 and 20 degrees from the longitudinal piston center axis.

7. The piston of claim 1, wherein the second bowl recess exit angle is between 5 and 20 degrees from the longitudinal piston center axis.

8. The piston of claim 1, wherein the bowl entry extends at an angle relative to the longitudinal piston center axis of between 100 and 110 degrees.

9. The piston of claim 1, wherein the piston bowl is configured to receive the fuel at a spray angle between 125 degrees and 140 degrees.

10. The piston of claim 1, wherein the bowl lip is located at an inner bowl radius, the bowl edge is located at an outer bowl radius, and the inner bowl radius is between 85% and 90% of the outer bowl radius.

11. An internal combustion engine comprising:
    a cylinder head defining a cylinder upper surface;
    a cylinder bore having a cylinder bore radius; and
    a piston for reciprocating within the cylinder bore, the piston comprising:
       a piston body including an outer cylindrical surface and being defined along a longitudinal piston center axis, the piston body having a first axial piston end and a second axial piston end; and
       a piston bowl defined in the first axial piston end, surrounded by an end perimeter surface on the first axial piston end, and configured to receive a fuel,
       a fuel injector configured to deliver fuel into the piston bowl,
       the piston bowl having a half section profile comprising:
          a bowl entry extending radially from the longitudinal piston center axis;
          a first bowl recess extending radially from the bowl entry and defining a bowl depth and a first radius of curvature;
          a second bowl recess extending radially from the first bowl recess to the end perimeter surface and defining a second radius of curvature;
          a bowl lip defined by the first bowl recess and the second bowl recess, the first bowl recess further defining a first bowl recess exit angle at the bowl lip; and
          a bowl edge defined by the second bowl recess and the end perimeter surface, the second bowl recess further defining a second bowl recess exit angle at the bowl edge;
          wherein the bowl entry of the piston bowl is configured to initially receive the fuel from the fuel injector, which is spaced from the bowl entry and disposed at the longitudinal piston center axis, before the fuel is directed to the first bowl recess at the bowl lip along the first bowl recess exit angle.

12. The engine of claim 11, wherein a piston clearance is defined between the cylinder upper surface and the end perimeter surface, the piston clearance being between 1 and 5 millimeters.

13. The engine of claim 11, further comprising the fuel injector configured to deliver the fuel into the piston bowl at a spray angle of between 125 and 140 degrees.

14. The engine of claim 11, wherein the piston bowl has an outer bowl radius defined between the longitudinal piston center axis and the bowl edge, the outer bowl radius being between 80% and 90% of the cylinder bore radius.

15. The engine of claim 11, wherein the bowl depth is between 20% and 25% of the outer bowl radius.

16. The engine of claim 11, wherein the bowl lip is located at a first bowl recess axial height of between 50% and 60% of the bowl depth.

17. The engine of claim 11, wherein the first radius of curvature and the second radius of curvature are each between 40% and 70% of the bowl depth.

18. The engine of claim 11, wherein the first bowl recess exit angle is formed between 5 and 20 degrees from the longitudinal piston center axis.

19. The engine of claim 11, wherein the second bowl recess exit angle is between 5 and 20 degrees from the longitudinal piston center axis.

20. The engine of claim 11, wherein the bowl entry extends at an angle relative to the longitudinal piston center axis of between 100 and 110 degrees.

\* \* \* \* \*